US012659721B2

(12) United States Patent
    Xu

(10) Patent No.: US 12,659,721 B2
(45) Date of Patent: Jun. 16, 2026

(54) PROVIDING AND MANAGING MOBILE NETWORK OPERATOR PROFILES

(71) Applicant: Irdeto B.V., Hoofddorp (NL)

(72) Inventor: Sheng-Bo Xu, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 254 days.

(21) Appl. No.: 18/277,530

(22) PCT Filed: Feb. 15, 2022

(86) PCT No.: PCT/EP2022/053616

§ 371 (c)(1),
(2) Date: Aug. 16, 2023

(87) PCT Pub. No.: WO2022/175239

PCT Pub. Date: Aug. 25, 2022

(65) Prior Publication Data

US 2024/0137747 A1    Apr. 25, 2024
US 2024/0236645 A9    Jul. 11, 2024

(30) Foreign Application Priority Data

Feb. 16, 2021    (EP) ..................................... 21157327

(51) Int. Cl.
    *H04W 8/20*     (2009.01)
    *H04W 12/0431*     (2021.01)
    *H04W 12/069*     (2021.01)

(52) U.S. Cl.
    CPC ....... *H04W 8/205* (2013.01); *H04W 12/0431* (2021.01); *H04W 12/069* (2021.01)

(58) Field of Classification Search
    CPC ............. H04W 8/205; H04W 12/0431; H04W 12/069; H04W 12/03; H04W 4/60;

(Continued)

(56) References Cited

U.S. PATENT DOCUMENTS

| | | | | | |
|---|---|---|---|---|---|
| 5,557,679 A | * | 9/1996 | Julin | .................... | G06Q 20/355 |
| | | | | | 380/281 |
| 2008/0052769 A1 | * | 2/2008 | Leone | ................... | H04W 12/03 |
| | | | | | 726/7 |

(Continued)

FOREIGN PATENT DOCUMENTS

| | | |
|---|---|---|
| EP | 2227014 A2 | 9/2010 |
| EP | 2227015 A2 | 9/2010 |

(Continued)

OTHER PUBLICATIONS

Extended European search report (EESR) for EP application 21157327.4 dated Aug. 10, 2021; 8 pages.

(Continued)

*Primary Examiner* — Mazda Sabouri
(74) *Attorney, Agent, or Firm* — James J. DeCarlo; Greenberg Traurig, LLP

(57) ABSTRACT

There is described a method, at a server system, of providing a mobile network operator (MNO) profile to a client device. The client device has a SIM software application stored thereon so as to provide the client device with a secured software implementation of SIM card functionality. The method comprises: (a) based on a unique identifier of the client device, identifying a unique key, $K_{SIM}$, of the SIM software application stored on the client device; (b) based on an MNO associated with the client device, identifying an unused MNO profile associated with the MNO; (c) encrypting the identified MNO profile so as to provide an encrypted MNO profile, wherein the encrypting comprises encrypting at least part of the identified MNO profile using $K_{SIM}$; (d) generating an MNO profile download message comprising the encrypted MNO profile and the unique identifier of the client device; and (e) broadcasting the MNO profile download message over a broadcast network so as to enable the client device to access the MNO profile download message.

(Continued)

There is also described a related method at a client device, as well as related computer programs and computer-readable media.

13 Claims, 2 Drawing Sheets

(58) Field of Classification Search
CPC ......... H04W 4/50; H04W 12/35; H04W 8/18;
G06F 8/61; H04L 63/0853
See application file for complete search history.

(56) References Cited

U.S. PATENT DOCUMENTS

| | | |
|---|---|---|
| 2015/0304506 A1 | 10/2015 | Zhu et al. |
| 2017/0317990 A1 | 11/2017 | Kim et al. |
| 2018/0084415 A1* | 3/2018 | Babbage ............... H04L 9/0841 |
| 2019/0174299 A1* | 6/2019 | Ullah ...................... H04W 4/50 |

FOREIGN PATENT DOCUMENTS

| | | |
|---|---|---|
| EP | 2334070 A1 | 6/2011 |
| EP | 2360918 | 8/2011 |

OTHER PUBLICATIONS

International Search Report and Written Opinion of the International Searching Authority for PCT Application No. PCT/EP2022/053616 dated May 2, 2022.

* cited by examiner

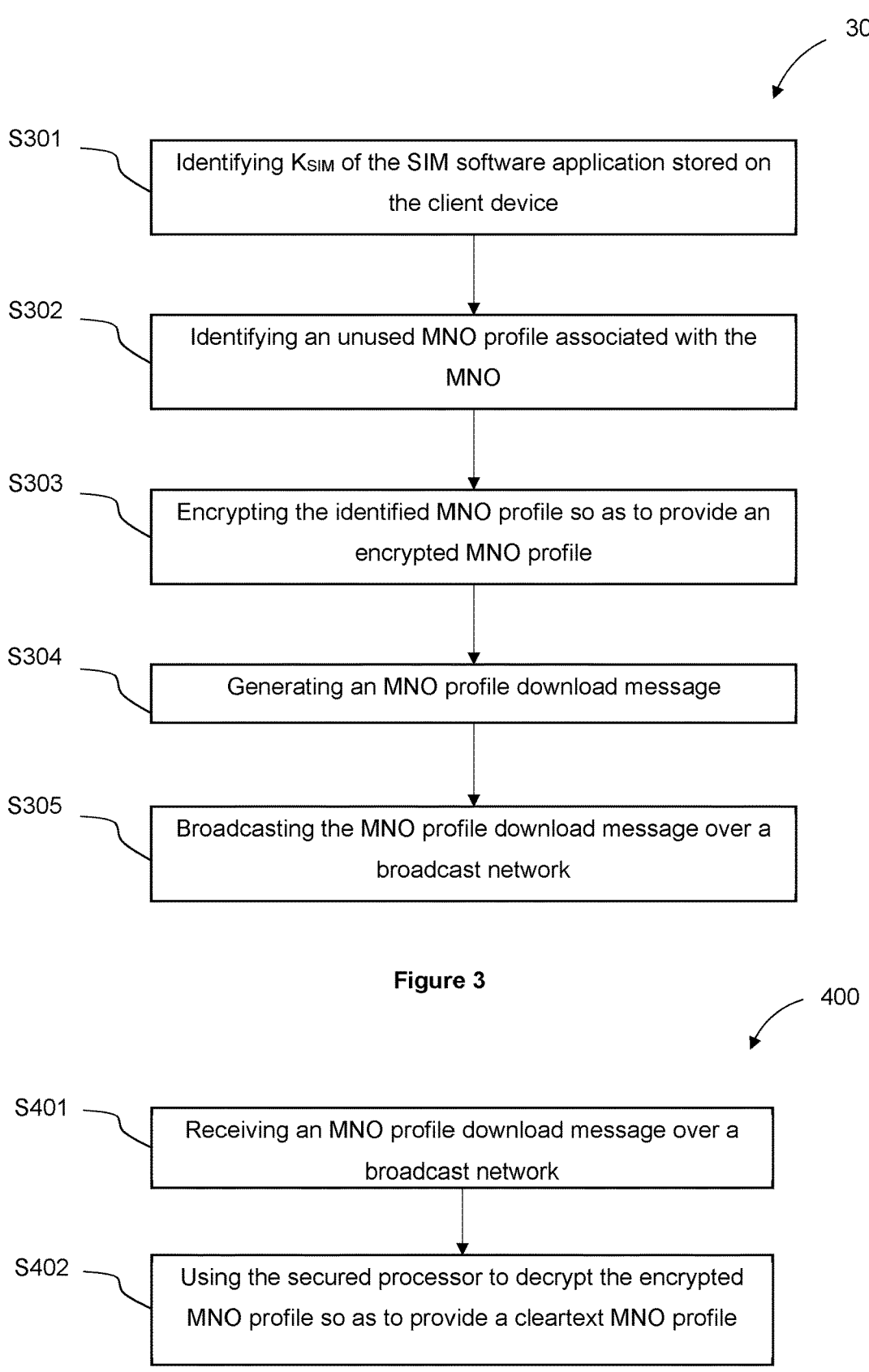

300

S301 — Identifying K$_{SIM}$ of the SIM software application stored on the client device S302 — Identifying an unused MNO profile associated with the MNO S303 — Encrypting the identified MNO profile so as to provide an encrypted MNO profile S304 — Generating an MNO profile download message S305 — Broadcasting the MNO profile download message over a broadcast network

S401 — Receiving an MNO profile download message over a broadcast network

S402 — Using the secured processor to decrypt the encrypted MNO profile so as to provide a cleartext MNO profile

Figure 4

PROVIDING AND MANAGING MOBILE NETWORK OPERATOR PROFILES

FIELD OF THE INVENTION

The present invention relates to a server-based method of providing a mobile network operator (MNO) profile to a client device. The present invention further relates to a client device-based method of managing received MNO profiles.

BACKGROUND OF THE INVENTION

Pay-TV operators often provide their subscribers with pay-TV client devices (i.e. set-top boxes) to enable their subscribers to receive pay-TV services that are broadcast by the pay-TV operators. Set-top boxes are, by design, able to receive TV content broadcast by the pay-TV operator, but most set-top boxes do not include a return path (i.e. they cannot transmit). Thus, there is no easy way for a pay-TV operator to obtain the status of their subscriber set-top boxes, or to receive viewing data.

More recently, some pay-TV operators have added mobile connectivity to their set-top boxes to provide a return path such that the set-top boxes are able send data back to the pay-TV operators. To connect the set-top boxes to mobile networks, the set-top boxes use a mobile modem and sub-scriber identity module (SIM) card.

Conventionally, a SIM card is a standalone smart card device having a rich set of functionalities, most of which are related to mobile phone subscription management. For set-top boxes, the high degree of functionality of a standard SIM card is unnecessary; all that is required is for the SIM card to enable the mobile modem to connect to a mobile network. Therefore, an alternative solution is desired to reduce the unnecessary costs associated with deploying existing SIM cards in set-top boxes.

The present invention seeks to provide an alternative solution which provides various advantages over those of the prior art.

SUMMARY OF THE INVENTION

Rather than using a physical SIM card, the present invention is associated with a client device (set-top box) having a SIM software application stored thereon which provides the client device with a secured software implementation of a SIM card.

When using a physical SIM card, it is necessary to activate the SIM card for use with a particular MNO. This may be done in an MNO store, or via an MNO website based, for example, on the integrated circuit card identifier (ICCID) of the SIM card. MNO profiles may then be provisioned via the mobile network. When using a set-top box having a SIM software application, a different approach is required. The SIM software application will not neces-sarily be associated with a particular ICCID ab initio. Therefore, according to the present disclosure, a pay-TV operator may provision an MNO profile to a set-top box by making use of their broadcast network.

According to a first aspect of the present invention, there is provided a method, at a server system, of providing an MNO profile to a client device. The client device has a SIM software application stored thereon so as to provide the client device with a secured software implementation of SIM card functionality. The method comprises: (a) based on a unique identifier of the client device, identifying a unique key, $K_{SIM}$, of the SIM software application stored on the client device; (b) based on an MNO associated with the client device, identifying an unused MNO profile associated with the MNO; (c) encrypting the identified MNO profile so as to provide an encrypted MNO profile, wherein the encrypting comprises encrypting at least part of the identi-fied MNO profile using $K_{SIM}$; (d) generating an MNO profile download message comprising the encrypted MNO profile and the unique identifier of the client device; and (e) broadcasting the MNO profile download message over a broadcast network so as to enable the client device to access the MNO profile download message.

According to a second aspect of the present invention, there is provided a method at a client device having a secured processor and a secured memory. The secured memory stores a SIM software application operable to provide the client device with a secured software implemen-tation of SIM card functionality. The method comprises: (a) receiving a mobile network operator, MNO, profile down-load message over a broadcast network, the MNO profile download message comprising a unique identifier of the client device and an encrypted MNO profile associated with an MNO; and (b) using the secured processor to decrypt the encrypted MNO profile so as to provide a clear text MNO profile, wherein the decrypting comprises at least a decryp-tion step using a unique key, $K_{SIM}$, of the SIM software application that is stored on the client device.

It is envisaged that the client device may be a set-top box, and the server system may be controlled by a pay-TV operator which provides pay-TV services to the set-top box by means of the broadcast network.

According to a third aspect of the present invention, there is provided a computer program which, when executed by one or more processors, causes the one or more processors to carry out the method according to either the first or second aspect set out above.

According to a fourth aspect of the present invention, there is provided a computer readable medium storing the computer program of the third aspect.

Other preferred features of the present invention are set out in the appended claims.

BRIEF DESCRIPTION OF THE DRAWINGS

Embodiments of the present invention will now be described by way of example with reference to the accom-panying drawings in which:

FIG. 3 is a flow chart schematically illustrating a method, at a server system, of providing an MNO profile to a client device.

FIG. 4 is a flow chart schematically illustrating a method 400, at a client device, enabling management of MNO profiles in the client device.

DETAILED DESCRIPTION OF A PREFERRED EMBODIMENT

Figure 1:
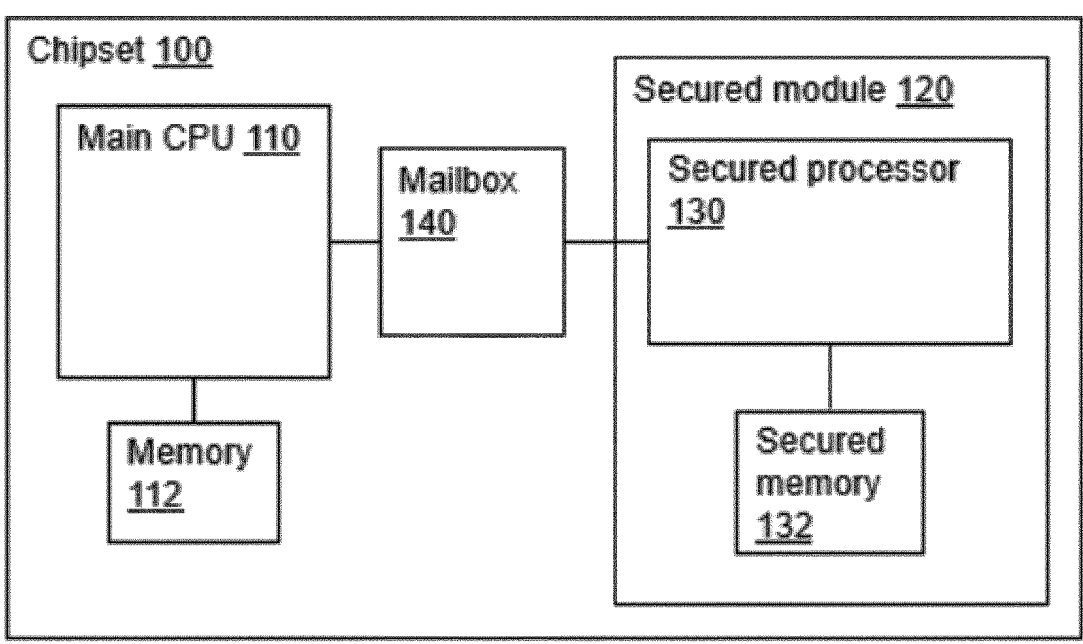
FIG. 1 is a schematic illustration of an exemplary decoder chipset for a broadcast-receiving client device (e.g. a set-top box).

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

In the following description, we first set out the technical context of the invention. In particular, we describe details of a server system (e.g. that of a pay-TV operator) and associated client devices (e.g. set-top boxes) used to implement the MNO profile download and MNO profile management methodologies of the present disclosure. With regard to the client devices, we describe the software SIM implementation used therein in section 1. With regard to the server systems, section 2 describes how the required data might be provided to the pay-TV operator to enable them to implement the claimed MNO profile download method. However, these matters fall outside the scope of the present invention, and different implementations may be envisaged without departing from the scope of the appended claims.

Having set out the technical context of the invention in sections 1-2, we then describe the server-based provisioning of MNO profiles to client devices in section 3, and the client-based management of MNO profiles in section 4. Further comments are provided in section 5.

1—Software SIM Implementation

For broadcast content delivery infrastructures, conditional access (CA) systems enable the selective delivery of analog and/or digital signals (such as television signals) to broadcast receivers (such as set-top boxes). A fairly extensive description of a CA system is given in EP2334070, the entire contents of which are incorporated herein by reference.

Traditionally, CA systems have relied on hardware protected key management functionality, e.g. in the form of a smart card. In order to reduce the cost of implementations, in some CA systems the functionality of the smart card is implemented/provided by a secured software implementation that executes in the broadcast receiver instead of using a smart card. Examples of such secure software implementations and the associated head-end functionality are set out, for example, in EP2227014, EP2227015 and EP2360918, the entire disclosures of which are incorporated herein by reference.

With this in mind, FIG. 1 schematically illustrates an exemplary decoder chipset 100 for a broadcast-receiving client device (e.g. a set-top box). The chipset 100 includes a main CPU 110 and associated memory 112. The chipset 100 further includes a secured module 120 having its own secured processor 130 for performing security operations, and associated secured memory 132. The secured module 120 is isolated from other hardware modules on the decoder chipset 100, except for a mailbox 140 which is used for communication between the secured module 120 and the main CPU 110. The secured memory 132 is totally isolated from other CPUs on the chipset (e.g. the main CPU 110) and may only be used by processors within the secured module 120 (e.g. the secured processor 130). The secured memory 132 includes secured ROM, secured RAM, and secured non-volatile memory (e.g. OTP memory), for example, so that the secured memory is able to store secret chip unique keys and secure data. The secured module 120 may be secured by means of hardware tamper resistance (e.g. those countermeasures implemented on a smart card) and/or software tamper resistance techniques (e.g. the use of so-called white-box protection techniques or software obfuscation techniques). The secured module 120 may further include (not shown): dedicated crypto hardware engines with strong countermeasures (like differential power analysis countermeasures), a hardware random number generator, and one or more security sensors/detectors. The ROM portion of the secured memory 132 includes code operable to implement a secure boot mechanism which enables authenticated download of a security application from the main CPU 110 into the RAM portion of the secured memory 132. Chipsets with the described functionality are currently available (e.g. see www.irdeto.com) and further details are beyond the scope of the invention.

Traditional SIM cards are based on smartcard chips which are isolated, standalone systems with advanced hardware security features and countermeasures against various logic and physical attacks. The software SIM implementation used in the present disclosure achieves a similar level of security in order to obtain the Global System for Mobile Communications Association (GSMA) certification. Therefore, the software SIM implementation used herein leverages the secured module 120 of the decoder chipset 100 to implement SIM functions which achieve the same security level as conventional SIM cards. The software SIM implementation used herein may be thought of as an "integrated SIM" for a particular decoder chipset 100.

It will be understood that a software SIM implementation of this kind is desirable to help pay-TV operators to reduce their set-top box bill of material (BOM) cost. In particular, there is a reduced cost due to the lack of physical SIM card. In addition, a physical SIM card requires a dedicated card reader mounted on the modem PCB, which adds additional hardware cost and complexity in the physical SIM implementation as compared to the software SIM implementation.

The software SIM implementation uses a SIM software application. The SIM software application may be implemented as a downloadable RAM application to implement the standard SIM functions and also manage MNO profile provisioning. In other words, the SIM software application is a software implementation of a standard hardware SIM card. The SIM software application provides all the functionality and security of a hardware SIM card, but is securely implemented in software in the secured module 120 of the chipset 100 of a client device.

Generally, the SIM software application will be downloaded onto the chipset 100 during manufacture of the chipset 100. In particular, the above-mentioned secure boot mechanism of the secured module 120 may be used to load the SIM software application into the RAM portion of the secured memory 132. However, it is also envisaged that the SIM software application could be downloaded (or updated) after manufacture of the chipset 100. For example, the broadcast channel of a pay-TV operator may be used to provide the SIM software application (or an update thereto) to the client device (e.g. set-top box) that includes the chipset 100. This would use a mechanism similar to the provisioning of MNO profiles to the client device, as described in section 3 below. After receiving the SIM software application via the broadcast channel, the secure boot mechanism of the secured module 120 may be used to load the SIM software application into the RAM portion of the secured memory 132.

As is known, physical SIM cards each have a unique identifier (namely the integrated circuit card identifier, or ICCID) and a secure unique key. Similarly, each SIM software application has an associated unique identifier (UID) and a secure unique secret key ($K_{SIM}$). $K_{SIM}$ can be either a symmetric key or a pair of (public and private) asymmetric keys. UID and $K_{SIM}$ are securely personalized into the secured module 120 of the chipset 100. For example, if the SIM software application is downloaded into the secured module 120 during manufacture of the chipset 100, then UID and $K_{SIM}$ may also be stored in a non-volatile portion of the secured memory 132 during manufacture of the chipset 100. A SIM software application vendor manages the generation, transfer and personalization of {UID, $K_{SIM}$} in a secure process audited by GSMA. Thus, such vendors maintain a secure database of {UID, $K_{SIM}$}.

Once manufactured, the chipset 100 is installed in an associated client device (e.g. the client device 200 of FIG. 2) including a mobile modem.

2—Initial Comments on the Server System

Figure 2:
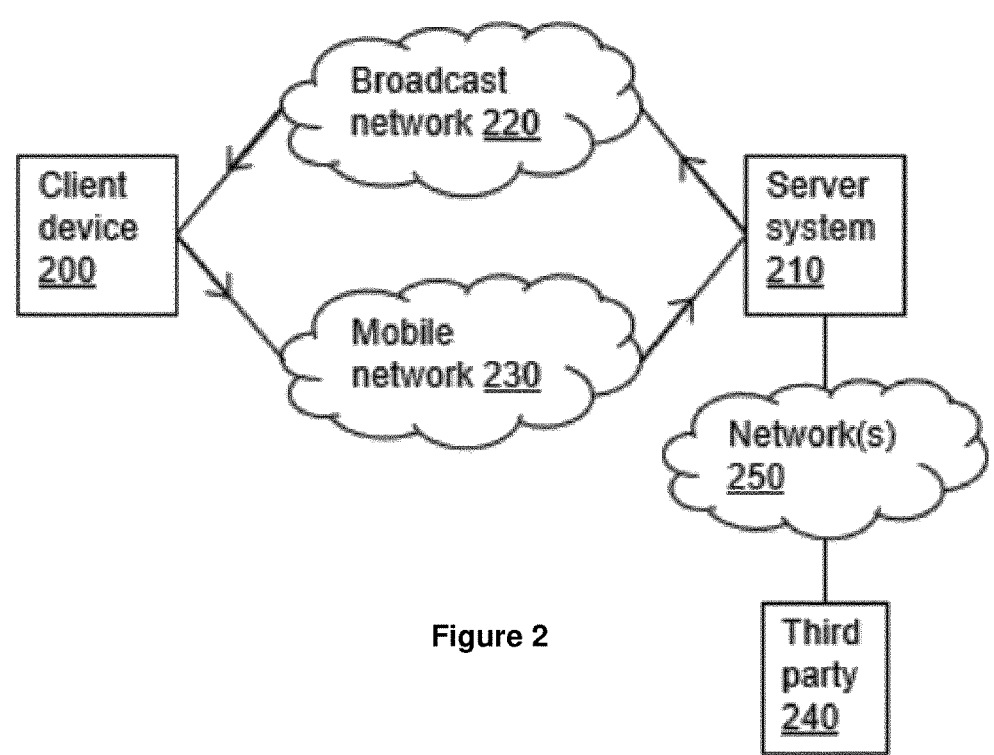
FIG. 2 is a schematic illustration of an exemplary archi-tecture of systems and communication networks used in the present disclosure with regard to the described server system and an exemplary subscriber client device.

FIG. 2 schematically illustrates an exemplary architecture of systems and communication paths used in the present disclosure. A client device 200 is able to receive content over a broadcast network 220 from a server system 210. The server system 210 is, for example, a server system controlled by a pay-TV operator, and the client device 200 is, for example, a subscriber client device. As such, the broadcast network 220 is associated with and managed by the server system 210. Equally, the client device 200 is associated with and managed by the server system 210. As mentioned in the Summary section, the broadcast network 220 only provides one-way communication from the server system 210 to the client device 220. Thus, a mobile network 230 is used to provide a return communication path from the client device 200 to the server system 210. In addition, FIG. 2 shows that the server system 210 is communicatively coupled to a third party entity 240 by means of network(s) 250. The network(s) 250 may comprise any suitable communication networks, such as the internet and/or mobile communication networks, etc.

Whilst only a single client device 200 is shown in FIG. 2, it will be understood that the server system 210 will generally broadcast to multiple subscriber client devices 200 using its broadcast network 220. However, different client devices 200 may use different mobile networks 230 for transmitting data back to the server system 210 depending on the mobile networks available in the vicinity of the client devices 200. In addition, FIG. 2 shows a single third party entity 240, but it will be understood that the server system 210 may be in communication with any number of third parties 240 by means of the network(s) 250.

According to the prior art, MNOs provision MNO profiles to associated physical SIM cards. However, the present disclosure uses SIM software applications rather than physical SIM cards. Notably, a pay-TV operator today may provide services across a large geographic area, possibly spanning multiple countries. Thus, it is likely that the serviced geographic area of a pay-TV operator will encompass multiple mobile networks provided by multiple MNOs. Furthermore, at the point of manufacture of a pay-TV client device 200 (i.e. a set-top box), it is impossible to know which MNO network(s) will be available for connection to the client device 200 once installed in a user's premises. Thus, it is not possible to provision MNO profiles at the point of manufacture of the client device 200. Instead, according to the present disclosure, it is the server system 210 controlling the broadcast network 220 that provisions MNO profiles to its subscriber client devices 200. In order to achieve this, the server system 210 requires access to certain data.

Firstly, the server system 210 requires access to multiple MNO profiles so as to enable the provisioning of MNO profiles to client devices (such as client device 200). An MNO profile comprises various MNO profile data. Typically, an MNO profile for a physical SIM card includes ICCID (integrated circuit card identifier), PLMN (public land mobile network), IMSI (international mobile subscriber identity), $K_{MNO}$ (a key for authenticated access of the relevant mobile network), etc. However, there is no physical SIM card in this case. Instead, there is a SIM software application installed on the client device 200. In this case, the SIM software application vendor may request MNO profile data from MNOs that have been pre-selected by the relevant pay-TV operator. The SIM software application vendor receives MNO profile data from the pre-selected MNOs via a secure channel either online or offline (this is beyond scope of the present disclosure). In practice, the SIM software application vendor generates MNO profiles on behalf of an MNO. The generated MNO profiles are in a format which is suitable for broadcast networks run by pay-TV operators. The MNO profiles each include an identifier of the MNO that is associated with the MNO profile (e.g. by means of specifying PLMN), the associated $K_{MNO}$, and also a user/subscriber identifier (e.g. IMSI). Hereafter, we assume that the SIM software application vendor has obtained the clear MNO profiles (either generated by the MNOs or by the SIM software application vendor itself). The SIM software application vendor is then able to provide the MNO profiles to the server system 210 (i.e. the pay-TV operator). With reference to FIG. 2, the SIM software application vendor may be considered to be a third party (e.g. the third party 240) such that the server system 210 receives the MNO profiles from the third party 240 via the network(s). Clearly, such information is securely transmitted with encryption and authentication, as required. Again, this is beyond the scope of the present disclosure.

Secondly, in order to enable the provisioning of MNO profiles to its subscriber client devices (such as client device 200), the server system 210 requires access to data relating to the SIM software applications that are loaded on each client device 200. As described above, each SIM software application has its own unique identifier (UID) and secure unique key ($K_{SIM}$). The server system 210 therefore needs to know the UID and $K_{SIM}$ associated with each client device 200. The SIM software application vendor is able to provide this information to the server system 210 (i.e. the pay-TV operator). With reference to FIG. 2, the server system 210 also receives the UID and $K_{SIM}$ data from a third party (e.g. the third party 240) via the network(s). Again, such information is securely transmitted with encryption and authentication, as required, but further details are beyond the scope of the present disclosure.

Having received both the MNO profiles and the SIM software application data from the third party 240, the server system 210 may store the data in two tables or databases, namely a first table/database of MNO profiles and a second table/database of SIM software applications.

For each MNO profile, the first table/database of MNO profiles initially includes:

The MNO profile itself, comprising an identifier of the MNO that is associated with the MNO profile (e.g. PLMN), the associated $K_{MNO}$, and also a user identifier (e.g. IMSI).

An identifier of the MNO profile (e.g. an MNO profile name or number).

The first table/database also has the capacity to store a unique identifier of a client device 200 that is associated with a particular MNO profile. However, it will be understood that the MNO profiles are not initially associated with any particular client devices. Subsequent provisioning of MNO profiles to client devices 200 is discussed in section 3 below. Also note that there may be multiple tables/databases of MNO profiles (one for each MNO as pre-selected by the pay-TV operator). Alternatively, there may be a single MNO profile table/database storing the profiles for all MNOs.

For each SIM software application, the second table/database of SIM software applications includes:

The unique identifier (UID) of the SIM software application.

The $K_{SIM}$ of the SIM software application.

The unique identifier (e.g. chipset serial number, or CSSN) of a client device on which the SIM software application is stored.

With these tables/databases accessible to the server system 210, the server system 210 is ready to provision MNO profiles to its subscriber client devices, as described in the following section.

3—Server-Based Method of Provisioning MNO Profiles to Client Devices

As previously discussed, the present disclosure relates to use of a broadcast network 220 to provision MNO profiles onto client devices 200. The provisioning is based on use of an existing CA system with newly defined functionality for MNO data import, MNO profile download, and MNO profile activation/de-activation. This is clearly different from physical SIM solutions which work with mobile networks.

As mentioned above, MNO profiles are not provisioned during production of the chipset 100 or client device 200. Once a client device 200 is delivered to a subscriber, the subscriber needs to provide a unique identifier of their client device 200 to the pay-TV operator to so that the device 200 can be activated. Similarly, the subscriber will need to provide data regarding available MNOs for their region. The MNO data can be obtained using the mobile modem of the client device 200. In particular, the mobile modem is able to scan for available mobile networks and display the results to the subscriber (e.g. via a connected television screen). The unique identifier of the client device 200 and the MNO data will generally be provided to the pay-TV operator by telephone or by means of a website interface. Once the pay-TV operator has received this information from the subscriber, this information becomes available to the server system 210 and enables the server system 210 to activate the client device 200 by provisioning a suitable MNO profile, as described in further detail below with reference to FIG. 3.

FIG. 3 is a flow chart schematically illustrating a method 300, at a server system 210, of providing an MNO profile to a client device 200. As described above, the client device 200 has a SIM software application stored thereon so as to provide the client device 200 with a secured software implementation of SIM card functionality. In a first step S301, the method 300 comprises, based on a unique identifier of the client device 200, identifying $K_{SIM}$ of the SIM software application stored on the client device 200. In a second step S302, the method 300 comprises, based on an MNO associated with the client device 200, identifying an unused MNO profile associated with the MNO. In a third step S303, the method 300 comprises encrypting the identified MNO profile so as to provide an encrypted MNO profile, wherein the encrypting comprises encrypting at least part of the identified MNO profile using $K_{SIM}$. In a fourth step S304, the method 300 comprises generating an MNO profile download message comprising the encrypted MNO profile and the unique identifier of the client device 200. In a fifth step S305, the method 300 comprises broadcasting the MNO profile download message over a broadcast network 220 so as to enable the client device to access the MNO profile download message. Each of these steps will be considered in more detail below.

The first step S301 comprises the server system 210 identifying the unique key ($K_{SIM}$) of the SIM software application stored on the client device 200 in question. This is done based on the unique identifier of the client device 200 (which was previously provided to the pay-TV operator by the subscriber, so is available to the server system 210). Thus, the first step S301 may be performed in response to the server system 210 receiving the unique identifier of the client device 200. The unique identifier of the client device 200 may, for example, be a client device serial number such as CSSN. The step S310 of identifying $K_{SIM}$ may, for example, be a two-step process comprising: (a) based on the unique identifier of the client device 210, identifying a unique identifier of the SIM software application stored on the client device 210; and then (b) based on the unique identifier of the SIM software application, identifying $K_{SIM}$ of the SIM software application. In practice, the step S310 of identifying $K_{SIM}$ will usually involve querying a database of SIM software applications, such as the second table/database of SIM software applications described in section 2 above.

The second step S302 comprises the server system 210 identifying a suitable unused MNO profile. In other words, based on an MNO associated with the client device 200, the server system 210 identifies an unused MNO profile associated with the MNO. An MNO associated with the client device 200 means an MNO who provides mobile network services in a region where the client device 200 is located. In other words, the unused MNO profile should be associated with an MNO available to the client device 200. Thus, the unused MNO profile identification is performed based on the MNO data previously provided to the pay-TV operator by the subscriber. As previously mentioned, the MNO data comprises data regarding available MNOs for the subscriber's region. The second step S302 may therefore be performed in response to the server system 210 receiving the MNO data relating to the client device 200.

In some instances, the received MNO data may identify only one MNO that is available to the client device 200. In this case, the unused MNO profile identification is performed based on that one MNO associated with the client device. In other instances, the received MNO data may identify more than one MNO that is available to the client device 200. In this case, the server system may select a preferred MNO based on a predefined order of preference for all of the pay-TV operator's pre-selected MNOs. The order of preference may be based on pricing information and/or connection quality information, etc. In this case, the unused MNO profile identification is performed based on the preferred MNO associated with the client device.

In practice, the step S302 of identifying an unused MNO profile will usually involve querying a database of MNO profiles, such as the first table/database of MNO profiles described in section 2 above. As previously mentioned, each MNO profile includes an identifier of the MNO that is associated with the MNO profile (e.g. the identifier may include the MNO name, or the mobile network code (MNC) for the MNO, or the PLMN), the associated $K_{MNO}$, and possibly also a user identifier (e.g. IMSI). Thus, it is possible to identify potential MNO profile candidates in the database using the MNO identifiers associated with each MNO profile. Alternatively, if there is a separate table/database per MNO, then it is simply a matter of querying the relevant table/database for that MNO. An unused MNO profile is defined as an MNO profile in the database which does not have an associated client device. Thus, the server system 210 may select any of the potential MNO profile candidates which does not already have an associated client device 200.

In the third step S303, the method comprises the server system 210 encrypting the identified MNO profile so as to provide an encrypted MNO profile. The encrypting comprises encrypting at least part of the identified MNO profile using $K_{SIM}$. This ensures that the encrypted MNO profile may only be decrypted by the client device 200 having the corresponding $K_{SIM}$. Thus, this encryption step ties/locks the MNO profile to a particular client device 200 (i.e. the client device 200 having the SIM software application with the $K_{SIM}$ that has been used for the encryption). Note again that $K_{SIM}$ can be either a symmetric key or a pair of (public and private) asymmetric keys. If using a symmetric key scheme, then a symmetric encryption cipher would be used, such as Advanced Encryption Standard (AES). If using an asymmetric key scheme, then an asymmetric encryption cipher would be used, such as RSA or ECC. In one example, encrypting at least part of the identified MNO profile using $K_{SIM}$ may comprise encrypting at least $K_{MNO}$ using $K_{SIM}$. In another example, encrypting at least part of the identified MNO profile using $K_{SIM}$ may comprise encrypting the entire MNO profile using $K_{SIM}$. Other examples are envisaged where more than just $K_{MNO}$, but less than the entire MNO profile, is encrypted using $K_{SIM}$.

In the fourth step S304, the method comprises the server system 210 generating an MNO profile download message, where the MNO profile download message includes the encrypted MNO profile and the unique identifier of the client device 200. The MNO profile download message may further comprise (a) an instruction for the client device 200 to add the MNO profile to its store of MNO profiles, and/or (b) an indication that the MNO profile has an active status, for example. Whilst the "active" status indication could be sent with the MNO profile download message, an alternative implementation could provide a separate broadcast message used to activate/deactivate a previously broadcast and downloaded MNO profile.

As an optional step, the method 300 may further comprise the server system 210 digitally signing at least part of the MNO profile download message (e.g. using a signing key of the server system) to enable subsequent authentication of the message by the client device 200. In a preferred example, it is envisaged that the entire MNO profile download message (including the header) is digitally signed in this way. The signing key may be a private key of the server system 210. The client device has access to a corresponding key (e.g. the public key of the server system 210) to enable verification of the message. Such digital signature schemes are well understood and will not be further described here.

Additionally/alternatively, another optional step of the method 300 involves protecting at least part of the MNO profile download message using the CA system normally used by the server system 210 and its subscriber client devices 200 for transmission of broadcast content. Since each MNO profile is intended for a specific client device 200 (i.e. each MNO profile is unique per device), the corresponding MNO profile download message is also unique to a particular device. This use of the CA system provides a second layer of protection.

In a fifth step S305, the method comprises the server system 210 broadcasting the MNO profile download message over a broadcast network 220. The MNO profile download message will be broadcast to all subscriber client devices 200 associated with the server system 210. However, due to the encryption described above, only the intended client device 200 will be able to access the MNO profile including in the message.

Notably, the method 300, which results in broadcasting an MNO profile download message (as per step S305) may occur in two main scenarios. Firstly, an MNO profile download message may be broadcast in response to the server system receiving the unique identifier of a new subscriber client device 200 and associated MNO data for that new client device 200. This is likely to correspond to a scenario in which a client device 200 is powered on for the first time and requires an MNO profile to enable its mobile modem to access mobile networks. Secondly, an MNO profile download message may be broadcast by the server system 210 when it is desired to change MNO for a particular client device 200 (e.g. due to an MNO contract change, or due to a change in the order of preference for the pay-TV operator's pre-selected MNOs). In this instance, the MNO profile download message enables a new active MNO profile to be downloaded onto the client device 200. Thus, a pay-TV operator may use its server system 210 in conjunction with the method 300 in order to switch MNOs so as to provide a better service and/or lower cost, thereby improving their service provision and/or reducing operational costs.

Although not shown, the method 300 may further comprise additional steps of the server system 210 receiving, from a third party 240, data for the database of SIM software applications and/or data for the database of MNO profiles. The received data may be initial data, new data, or updated data. As mentioned in section 2 above, the third party 240 may be the SIM software application vendor.

After generating the MNO profile download message in step S304, the method 300 may further comprise a step of the server system 210 associating the identified MNO profile with the client device 200. This may be done by updating the database of MNO profiles to associate the identified MNO profile with the unique identifier of the client device 200.

In some instances, it is useful for the server system 210 to be able to tell a client device 200 to delete an MNO profile that has previously been provided by means of an MNO profile download message. Thus, the method 300 may further comprise the server system 210 identifying an MNO profile that is associated with the client device 200 and is to be deleted from the client device 200. The server system 210 may then generate an MNO profile delete message comprising the unique identifier of the client device 200 and an identifier of the MNO profile to be deleted from the client device 200. The server system 210 may then broadcast the MNO profile delete message over the broadcast network so as to enable the client device 200 to access the MNO profile delete message.

In other instances, it is useful for the server system 210 to be able to tell a client device 200 to update an MNO profile that has previously been provided by means of an MNO profile download message. Thus, the method 300 may further comprise the server system 210 encrypting an updated MNO profile so as to provide an encrypted updated MNO profile, where the encrypting comprises encrypting at least part of the identified MNO profile using $K_{SIM}$. The server system 210 may then generate an MNO profile update message comprising the encrypted updated MNO profile and the unique identifier of the client device 200 associated with the updated MNO profile. The server system 210 may then broadcast the MNO profile update message over the broadcast network 220 so as to enable the client device 200 to access the MNO profile update message.

4—Client Device-Based Method of Managing MNO Profiles

Having described the server-led provisioning of an MNO profile to a client device 200 via the broadcast network 220, this section describes what happens at the client device 200 in response to receiving a MNO profile download message from the server system 210. Thus, this section focuses on managing MNO profiles in a client device 200 that includes a SIM software application.

FIG. 4 is a flow chart schematically illustrating a method 400 at a client device 200. The client device 200 has a secured processor (e.g. secured processor 130 of the chipset 100) and a secured memory (e.g. the secured memory 132 of the chipset 100). The secured memory stores a SIM software application operable to provide the client device 200 with a secured software implementation of SIM card functionality. In a first step S401, the method 400 comprises receiving an MNO profile download message over a broadcast network 220. The MNO profile download message comprises a unique identifier of the client device 200 and an encrypted MNO profile associated with an MNO. In a second step S402, the method 400 comprises using the secured processor to decrypt the encrypted MNO profile so as to provide a clear text MNO profile. The decrypting comprises at least a decryption step using $K_{SIM}$ of the SIM software application that is stored on the client device 200. Each of these steps will be considered in more detail below.

The first step S401 comprises the client device 200 receiving an MNO profile download message over a broadcast network 220. The MNO profile download message comprises a unique identifier (e.g. CCSN) of the client device 200 and an encrypted MNO profile associated with an MNO. All client devices 200 configured to receive data from the server system 210 via the broadcast network 220 will receive the MNO profile download message. However, as discussed below, only the intended client device 200 will be able to access the MNO profile due to the encryption used.

The second step S402 comprises the client device 200 using the secured processor to decrypt the encrypted MNO profile so as to provide a clear text (i.e. unencrypted/decoded/plaintext) MNO profile. The second step S402 may be performed at runtime of the SIM software application since the clear text MNO profile is required at runtime of the SIM software application. The decrypting comprises at least a decryption step using $K_{SIM}$ of the SIM software application that is stored on the client device 200. It is this decryption using $K_{SIM}$ which means that only the intended client device 200 can decrypt the encrypted MNO profile. All other client devices will have their own unique $K_{SIM}$ which will not be effective in decrypting the encrypted MNO profile. Thus, the MNO profile is effectively tied/locked to the intended client device 200 (i.e. the client device 200 having the SIM software application with the $K_{SIM}$ that has been used for the encryption). Other client devices 200 will effectively ignore the MNO profile download message since they are unable to decrypt it. Note again that $K_{SIM}$ can be either a symmetric key or a pair of (public and private) asymmetric keys. If using a symmetric key scheme, then a symmetric decryption cipher would be used, such as AES. If using an asymmetric key scheme, then an asymmetric decryption cipher would be used, such as RSA or ECC. In one example, the decrypting may comprise decrypting at least $K_{MNO}$ using $K_{SIM}$. In another example, the decrypting may comprise decrypting the entire MNO profile using $K_{SIM}$. Other examples are envisaged where more than just $K_{MNO}$, but less than the entire MNO profile, is decrypted using $K_{SIM}$.

If the MNO profile download message comprises a digital signature, the method 400 may further comprise the client device 200 using a known key to authenticate/verify the MNO profile download message, where the known key is associated with the server system 210 that broadcast the MNO profile download message. Thus, it is possible for the client device 200 to verify that the MNO profile download message originated from the relevant server system 210/pay-TV operator. Preferably, the client device 200 verifies the signature of the MNO profile download message before attempting any decryption in step S402.

In some cases, the MNO profile download message may have been protected by the CA system normally used by the server system 210 and its subscriber client devices 200 for transmission of broadcast content. In such cases, the method 400 may further comprise processing the MNO profile download message using that CA system. Use of such systems is well understood and will not be described further here.

At runtime, the method 400 may further comprise storing the clear text MNO profile in the secured memory of the client device 200 (e.g. in a RAM portion of the secured memory 132 of the chipset 100). The encrypted MNO profile may be stored in a non-volatile memory of the client device 200 that need not be located on the chipset 100. For example, the encrypted MNO profile may be stored in a flash memory of the client device 200. This ensures that the downloaded MNO profile remains available for use even after a reboot of the client device 200. It will be understood that MNO profile will only be stored if any decryption and verification of the MNO profile download message has been successful.

In some instances, the client device 200 may have more than one MNO profile stored (e.g. the client device 200 may have more than one encrypted MNO profile stored in its flash memory). In such cases, each MNO profile may be stored together with an active or inactive status. In one example, only the most recently stored MNO profile is considered to be active. Thus, whenever a new MNO profile is stored, its status can be set to be active, and all other MNO profile statuses can be set to be inactive. In another example, the status of an MNO profile may be provided in an MNO profile download message and/or subsequently in an MNO profile update message. In either case, at runtime of the SIM software application, only an active profile is loaded into the secured memory of the client device (e.g. a RAM portion of the secured memory 132) for use by the SIM software application. In such cases, the SIM software application always performs any decryption and authentication before using the loaded MNO profile.

Although not shown, the method 400 may further comprise the client device 200 using the SIM software application and the clear text MNO profile to securely access the mobile network of the associated MNO. For example, this line of communication may be used to provide the server system 210 with status information or viewing data relating to the subscriber client device 200. The detail is beyond the scope of this disclosure.

In one example, an MNO profile delete message enables deletion of an MNO profile which was previously received and stored by the client device 200. In this example, the method 400 further comprises receiving an MNO profile delete message over the broadcast network 220. The MNO profile delete message comprises the unique identifier of the client device 200 and an identifier of an MNO profile previously received by the client device 200. Based on the identifier of the previously-received MNO profile, the method 400 then comprises the client device 200 identifying the previously-received MNO profile on the client device 200. Finally, the method 400 comprises the client device 200 deleting the identified MNO profile from the client device 200. This methodology enables a pay-TV operator to delete defunct MNO profiles from their subscriber client devices 200. The MNO profile delete message is unique and is protected by the server system 210 in the same way as an MNO profile download message. When the client device receives an MNO profile delete message, it decrypts/verifies the message in the same way as it would do for an MNO profile download message, as described above. As will be understood, the MNO profile is only deleted if the decryption/verification succeeds.

In another example, an MNO profile update message enables updating of an MNO profile which was previous received and stored by the client device 200. In this example, the method 400 further comprises the client device 200 receiving an MNO profile update message over the broadcast network 220. The MNO profile update message comprises the unique identifier of the client device 200, an identifier of the MNO profile to be updated, and an encrypted updated MNO profile. Based on the identifier of the MNO profile to be updated, the method 400 then comprises the client device 200 identifying the MNO profile to be updated on the client device 200. The method also comprises the client device 200 using the secured processor to decrypt the encrypted updated MNO profile so as to provide a clear text updated MNO profile. As for the processing of the MNO profile download message, the decrypting comprises at least a decryption step using $K_{SIM}$ of the SIM software application that is stored on the client device 200. Finally, based on the clear text updated MNO profile, the method 400 comprises the client device 200 updating the identified MNO profile on the client device 200. This final updating step may comprise encrypting the updated version such that it can be stored securely in the flash memory of the client device 200 together with any other encrypted MNO profiles (as described above). In other words, the encrypted old version stored in the flash memory is replaced by the encrypted new version.

Notably, an MNO profile update message may be used to change some, but not all, of the data in a previously-received MNO profile. If all of the data is to be changed, then another option would be to delete the previously-received MNO profile using an MNO profile delete message, and then download a new one using an MNO profile download message. The updated MNO profile may comprise, for example, updated profile status information, as discussed previously. Additionally/alternatively, an MNO profile update message may be used to change the preferred mobile network list. The MNO profile update message is unique and is protected by the server system 210 in the same way as an MNO profile download message. When the client device receives an MNO profile update message, it decrypts/verifies the message in the same way as it would do for an MNO profile download message, as described above. As will be understood, the MNO profile is only updated if the verification succeeds.

5—Further Comments

As discussed above, the present invention enables a server system 210 to provide an MNO profile to a client device 200 by means of an existing broadcast network 200. The present invention also provides for management of MNO profiles at the client device 200. Thus, using their existing broadcast network 220, a pay-TV operator can remotely manage MNO profiles stored in their subscriber client devices 200. Preferably, the described architecture also enables pay-TV operators to remotely activate and/or de-activate MNO profiles in specific client devices 200.

As previously discussed, the encryption and decryption of MNO profile related messages (e.g. an MNO profile download message) generally involves using the secure unique secret key ($K_{SIM}$) of the SIM software application associated with a particular client device 200. However, if the server system 210 initially has no access to $K_{SIM}$ for some reason, then the secret keys ($K_{CAS}$) associated with the CA system could be used instead. In particular, the server system 210 is already able to securely broadcast content to the client device 200 by means of its CA system. The CA system has one or more secret keys $K_{CAS}$ for these purposes, as is well known. For example, each client device 200 will have its own unique secret key for use by the CA system. Thus, alternative versions of the methods 300 and 400 are also provided.

In an alternative to the method 300, there is provided a method (not shown), at a server system 210, of providing an MNO profile to a client device 200. As described above, the client device 200 has a SIM software application stored thereon so as to provide the client device 200 with a secured software implementation of SIM card functionality. Firstly, the method comprises, based on a unique identifier of the client device 200, identifying a unique secret key, K, of the client device 200. In the method 300, K is $K_{SIM}$. However, when $K_{SIM}$ is not available, K may alternatively be $K_{CAS}$, namely a CA system key that is uniquely associated with the client device 200 and that enables the server system 210 to securely broadcast content to the client device 200. Secondly, the method comprises, based on an MNO associated with the client device 200, identifying an unused MNO profile associated with the MNO. Thirdly, the method comprises encrypting the identified MNO profile so as to provide an encrypted MNO profile, wherein the encrypting comprises encrypting at least part of the identified MNO profile using K. Fourthly, the method comprises generating an MNO profile download message comprising the encrypted MNO profile and the unique identifier of the client device 200. Fifthly, the method comprises broadcasting the MNO profile download message over a broadcast network 220 so as to enable the client device to access the MNO profile download message.

In an alternative to the method 400, there is provided a method (not shown) at a client device 200. The client device 200 has a secured processor (e.g. secured processor 130 of the chipset 100) and a secured memory (e.g. the secured memory 132 of the chipset 100). The secured memory stores a SIM software application operable to provide the client device 200 with a secured software implementation of SIM card functionality. Firstly, the method comprises receiving an MNO profile download message over a broadcast network 220. The MNO profile download message comprises a unique identifier of the client device 200 and an encrypted MNO profile associated with an MNO. Secondly, the method comprises using the secured processor to decrypt the encrypted MNO profile so as to provide a clear text MNO profile. The decrypting comprises at least a decryption step using a secret key, K, of the client device 200. In the method 400, K is $K_{SIM}$. However, K may alternatively be $K_{CAS}$, namely a CA system key that is uniquely associated with the client device 200 and that enables the client device 200 to decrypt content broadcast by the server system 210.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set-top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method comprising:
communicating, by a server system, over a broadcast network, content to a client device, the client device having a subscriber identity module (SIM) software application stored thereon for secured software implementation of SIM card functionality;

receiving, by the server system, via a return communication path over a mobile network, information from the client device;

based on a unique identifier of the client device, identifying a unique key, $K_{SIM}$, of the SIM software application stored on the client device;

based on a mobile network operator (MNO) associated with the client device, identifying an unused MNO profile associated with the MNO;

encrypting the identified MNO profile so as to provide an encrypted MNO profile, wherein the encrypting comprises encrypting at least part of the identified MNO profile using the $K_{SIM}$;

generating an MNO profile download message comprising the encrypted MNO profile and the unique identifier of the client device; and broadcasting the MNO profile download message over the broadcast network, the broadcasting over the broadcast network enabling the client device to access the MNO profile download message.

2. The method of claim 1 wherein the encrypting comprises one or more of:
when the MNO profile comprises a key, $K_{MNO}$, for authenticated access of the mobile network of the MNO, encrypting at least $K_{MNO}$ using $K_{SIM}$.

3. The method of claim 1 further comprising digitally signing the MNO profile download message using a key of the server system to enable subsequent authentication of the message by the client device.

4. The method of claim 1 wherein the MNO profile download message further comprises one or more of:
an instruction for the client device to add the MNO profile to its store of MNO profiles; or
an indication that the MNO profile has an active status.

5. The method of claim 1 wherein identifying $K_{SIM}$ comprises querying a database of SIM software applications, and wherein, for each SIM software application, the database comprises:
a unique identifier of the SIM software application;
the $K_{SIM}$ of the SIM software application; and
the unique identifier of a client device on which the SIM software application is stored.

6. The method of claim 1 wherein identifying an unused MNO profile comprises querying a database of MNO profiles, and wherein, for each MNO profile, the database comprises:
the MNO profile itself;
an identifier of the MNO profile;
an identifier of the MNO that is associated with the MNO profile; and
optionally, a unique identifier of a client device that is associated with the MNO profile;
wherein an unused MNO profile is an MNO profile without an associated client device.

7. The method of claim 1 further comprising:
identifying an MNO profile that is associated with the client device and is to be deleted from the client device;
generating an MNO profile delete message comprising the unique identifier of the client device and an identifier of the MNO profile to be deleted from the client device; and
broadcasting the MNO profile delete message over the broadcast network so as to enable the client device to access the MNO profile delete message.

8. The method of claim 1 further comprising:

encrypting an updated MNO profile so as to provide an encrypted updated MNO profile, wherein the encrypting comprises encrypting at least part of the identified MNO profile using $K_{SIM}$;

generating an MNO profile update message comprising the encrypted updated MNO profile and the unique identifier of the client device associated with the updated MNO profile; and broadcasting the MNO profile update message over the broadcast network so as to enable the client device to access the MNO profile update message.

9. A method comprising:

receiving, by a client device, a mobile network operator (MNO) profile download message over the broadcast network from a server system, the MNO profile download message comprising a unique identifier of the client device and an encrypted MNO profile associated with an MNO;

using a secured processor of the client device to decrypt the encrypted MNO profile to provide a clear text MNO profile, the decrypting comprising at least a decryption step using a unique key, $K_{SIM}$, of a subscriber identity module (SIM) software application that is stored in secured memory of the client device; and using, by the client device, the SIM software application and the clear text MNO profile to securely access a mobile network of the associated MNO for communication with the server system.

10. The method of claim 9 wherein, the MNO profile comprises a key, $K_{MNO}$, for authenticated access of the mobile network of the MNO, and the decrypting comprises decrypting at least $K_{MNO}$ using $K_{SIM}$.

11. The method of claim 9 wherein the MNO profile download message comprises a digital signature, and the method further comprises using a known key associated with the server system that broadcast the MNO profile download message to authenticate the MNO profile download message.

12. The method of claim 9 further comprising:

receiving an MNO profile delete message over the broadcast network, the MNO profile delete message comprising the unique identifier of the client device and an identifier of an MNO profile previously received by the client device;

based on the identifier of the previously-received MNO profile, identifying the previously-received MNO profile on the client device; and deleting the identified MNO profile from the client device.

13. The method of claim 9 further comprising:

receiving an MNO profile update message over the broadcast network, the MNO profile update message comprising the unique identifier of the client device, an identifier of the MNO profile to be updated, and an encrypted updated MNO profile;

based on the identifier of the MNO profile to be updated, identifying the MNO profile to be updated on the client device;

using the secured processor to decrypt the encrypted updated MNO profile so as to provide a clear text updated MNO profile, wherein the decrypting comprises at least a decryption step using $K_{SIM}$ of the SIM software application that is stored on the client device; and based on the clear text updated MNO profile, updating the identified MNO profile on the client device.

\* \* \* \* \*